United States Patent
Mönnich

(10) Patent No.: US 10,800,041 B2
(45) Date of Patent: Oct. 13, 2020

(54) ABSOLUTE POSITION DETERMINATION OF A ROBOTIC DEVICE AND ROBOTIC DEVICE

(71) Applicant: Siemens Healthcare GmbH, Erlangen (DE)

(72) Inventor: Holger Mönnich, Friedberg (DE)

(73) Assignee: Siemens Healthcare GmbH, Erlangen (DE)

( * ) Notice: Subject to any disclaimer, the term of this patent is extended or adjusted under 35 U.S.C. 154(b) by 232 days.

(21) Appl. No.: 16/101,866

(22) Filed: Aug. 13, 2018

(65) Prior Publication Data
US 2019/0054622 A1 Feb. 21, 2019

(30) Foreign Application Priority Data
Aug. 17, 2017 (EP) .................................. 17186586

(51) Int. Cl.
G05B 15/00 (2006.01)
G05B 19/00 (2006.01)
B25J 9/16 (2006.01)

(52) U.S. Cl.
CPC ........... *B25J 9/1671* (2013.01); *B25J 9/1633* (2013.01); *B25J 9/1674* (2013.01); *B25J 9/1694* (2013.01); *G05B 2219/39261* (2013.01); *G05B 2219/39326* (2013.01)

(58) Field of Classification Search
CPC ...... B25J 9/1633; B25J 9/1671; B25J 9/1674; B25J 9/1694; G05B 2219/39261; G05B 2219/39326
See application file for complete search history.

(56) References Cited

U.S. PATENT DOCUMENTS

| | | | |
|---|---|---|---|
| 10,583,558 B2* | 3/2020 | Ikeda | B25J 9/1633 |
| 2015/0290799 A1* | 10/2015 | Iwatake | G01L 5/0038 700/257 |
| 2015/0290810 A1* | 10/2015 | Iwatake | B25J 9/1651 700/258 |

(Continued)

FOREIGN PATENT DOCUMENTS

| | | |
|---|---|---|
| DE | 102015013635 A1 | 5/2016 |
| EP | 1525954 A2 | 4/2005 |

OTHER PUBLICATIONS

European Search Report for corresponding Application No. 17186586.8-1001, dated Feb. 26, 2018.

*Primary Examiner* — Harry Y Oh
(74) *Attorney, Agent, or Firm* — Lempia Summerfield Katz LLC

(57) ABSTRACT

A method is provided for absolute position determination of the end effector of a robotic device with a kinematic chain of movable components. At least one current torque or one value corresponding to the torque is measured on at least one movable component of the kinematic chain of the robotic device by a torque sensor arranged on the movable component. At least one torque is calculated on the basis of model data of the robotic device for the movable component. A difference between the measured torque and the calculated torque is determined. If the difference exceeds a prespecified threshold value, the at least one measured torque is used instead of the calculated torque to determine an absolute position of the end effector of the robotic device.

8 Claims, 1 Drawing Sheet

(56) References Cited

U.S. PATENT DOCUMENTS

2016/0121484 A1* 5/2016 Ikeda ..................... B25J 9/1674
700/256
2016/0221193 A1* 8/2016 Sato ....................... B25J 9/1674

* cited by examiner

ABSOLUTE POSITION DETERMINATION OF A ROBOTIC DEVICE AND ROBOTIC DEVICE

RELATED CASE

This application claims the benefit of EP 17186586, filed on Aug. 17, 2017, which is hereby incorporated by reference in its entirety.

FIELD

The present embodiments relate to a method for absolute position determination of the end effector of a robotic device and a robotic device for carrying out such a method.

BACKGROUND

Robotic devices with a chain of movable components such as, for example, serial articulated arm robots, are typically not characterized by high absolute accuracy in their positioning (accuracy with respect to an external coordinate position). For example, although the robotic devices repeatedly approach positions very exactly, typically with a so-called repeat accuracy of <0.1 mm, the robotic devices generally do not approach positions with absolute accuracy and thus deviations in the range of centimeters occur in the working area. This is caused by tolerances in the production of the components, deviations between the CAD model used for the robot and the real robot (geometric deviations) and by dynamic effects—in this case, above all the deflection of the robot due to gravity. Herein, the elasticity of the gear mechanism typically exerts a very high influence while the structure of the robot exerts little influence. Further deviations occur as the result of other influential factors such as, for example, the temperature and the extension of the material induced thereby (in the range of tenths of millimeters).

To date, serial articulated arm robots have used model values to compensate for the error. The resulting error is typically within the range of −0.5 mm. With dynamic effects, the assumptions from the mathematical model are based purely on model values. For modeling of errors, see, for example, Biniam Yohannes, Calibration of Light-weight Robots with Seven Degrees of Freedom, Thesis, Chapters 3.4 and 3.5, pages 21-31, 2008 or U. Wiest, Kinematic Calibration of Industrial Robots, Dissertation, Chapters 3.4 and 3.5, pages 28 to 34, 2001. However, the accuracy of the model values used is only applicable in cases when, and under the assumption that, the robot moves freely in the area and is not in contact with anything. If the robot is in contact with another object or if further errors occur in the model values, there can be a significant deterioration in the absolute accuracy during the positioning of an articulated arm robot and the end effector thereof.

SUMMARY AND DETAILED DESCRIPTION

It is an object of the present embodiments to provide a method, which facilitates an enhancement of the absolute accuracy during positioning of articulated arm robots. The enhanced accuracy may be provided even with an exposure to an external influence. A robotic device suitable for carrying out the method is provided.

The object may be achieved by a method for absolute position determination of the end effector of a robotic device and by a robotic device. The scope of the present invention is defined solely by the appended claims and is not affected to any degree by the statements within this summary.

With the method for absolute position determination of the end effector of a robotic device with a kinematic chain of movable components, at least one current torque or a value corresponding to the torque is measured on at least one movable component of the kinematic chain of the robotic device by a torque sensor arranged on the movable component. At least one torque calculated on the basis of model data of the robotic device for the movable component is provided. A difference between the measured torque and the calculated torque is determined. If the difference exceeds a prespecified threshold value, the at least one measured torque is used instead of the calculated torque to determine an absolute position of the end effector of the robotic device. The determination of the absolute position significantly enhances accuracy and hence enhances the suitability of the robotic device to be used for applications for high absolute accuracy. The method may be used to detect deviations, which occur as the result of contact with external objects, appliances or people or as a result of errors in the model data. The deviations may then be replaced by enhanced values and thus are no longer able to falsify the determination of the absolute position. The method is able to achieve high absolute accuracy in the determination of the position of the end effector.

According to one embodiment, at least two current torques are measured and, at least two corresponding calculated torques are provided. At least two differences are determined. For each difference that exceeds a prespecified threshold value, the measured torque is used instead of the calculated torque to determine an absolute position of the end effector of the robotic device. Ideally, torque sensors on which corresponding values for the torques are measured and compared with the calculated values are arranged in or on all axes of the robotic device (e.g., in the case of six- or seven-axis articulated arm robots on 6 or 7 axes). This enables the achievement of a reliable absolute accuracy of up to <0.1 mm that is also protected against external influences.

According to a further embodiment, the respective difference is used as a starting point for the determination of the respective external torque. If, for example, it assumed that there are no errors in the model values, conclusions may be drawn from the difference regarding external influences, such as contact with external objects, appliances, or people.

A robotic device for carrying out the method includes a kinematic chain of movable components. A torque sensor for measuring a torque or a value corresponding to the torque is arranged on at least one movable component of the kinematic chain. An end effector is arranged on the end of the kinematic chain. The end effector is embodied to be positioned by the robotic device. A system control is provided for actuating the kinematic chain and the torque sensors. A calculator (e.g., control or other processor) is provided for the determination of calculated torques from model data, for calculating differences between measured and calculated torques, for comparing the differences with prespecified threshold values, and for the determination of the absolute position of the end effector from calculated and measured torques. In particular, the robotic device is a serial articulated arm robot, for example a six-axis articulated arm robot or a seven-axis articulated arm robot in light-weight form.

For particularly accurate positioning, the robotic device advantageously includes at least two torque sensors, which are arranged on different points of the kinematic chain.

There are at least as many torque sensors as there are axes, and the torque sensors are arranged on the respective axes or joints.

BRIEF DESCRIPTION OF THE DRAWINGS

The embodiments are described in the following with reference to the exemplary embodiments in the drawings without this restricting the invention to these exemplary embodiments. The drawing shows.

DETAILED DESCRIPTION

Figure 1:
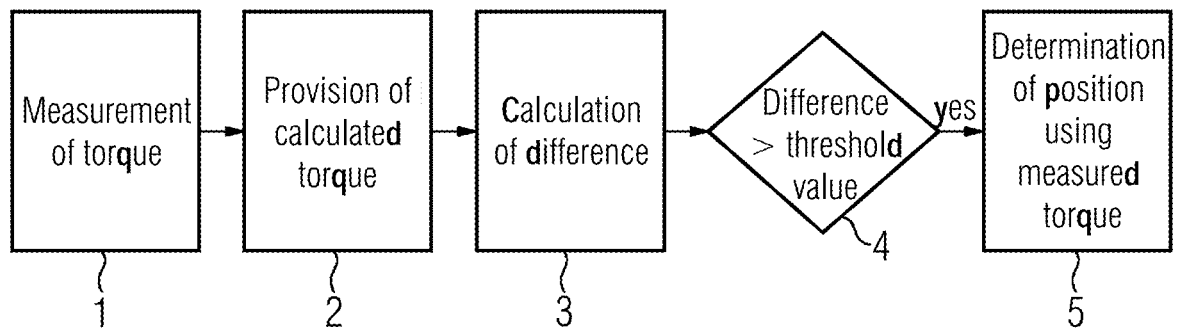
FIG. 1 is a sequence of a method according to one embodiment.
Figure 2:
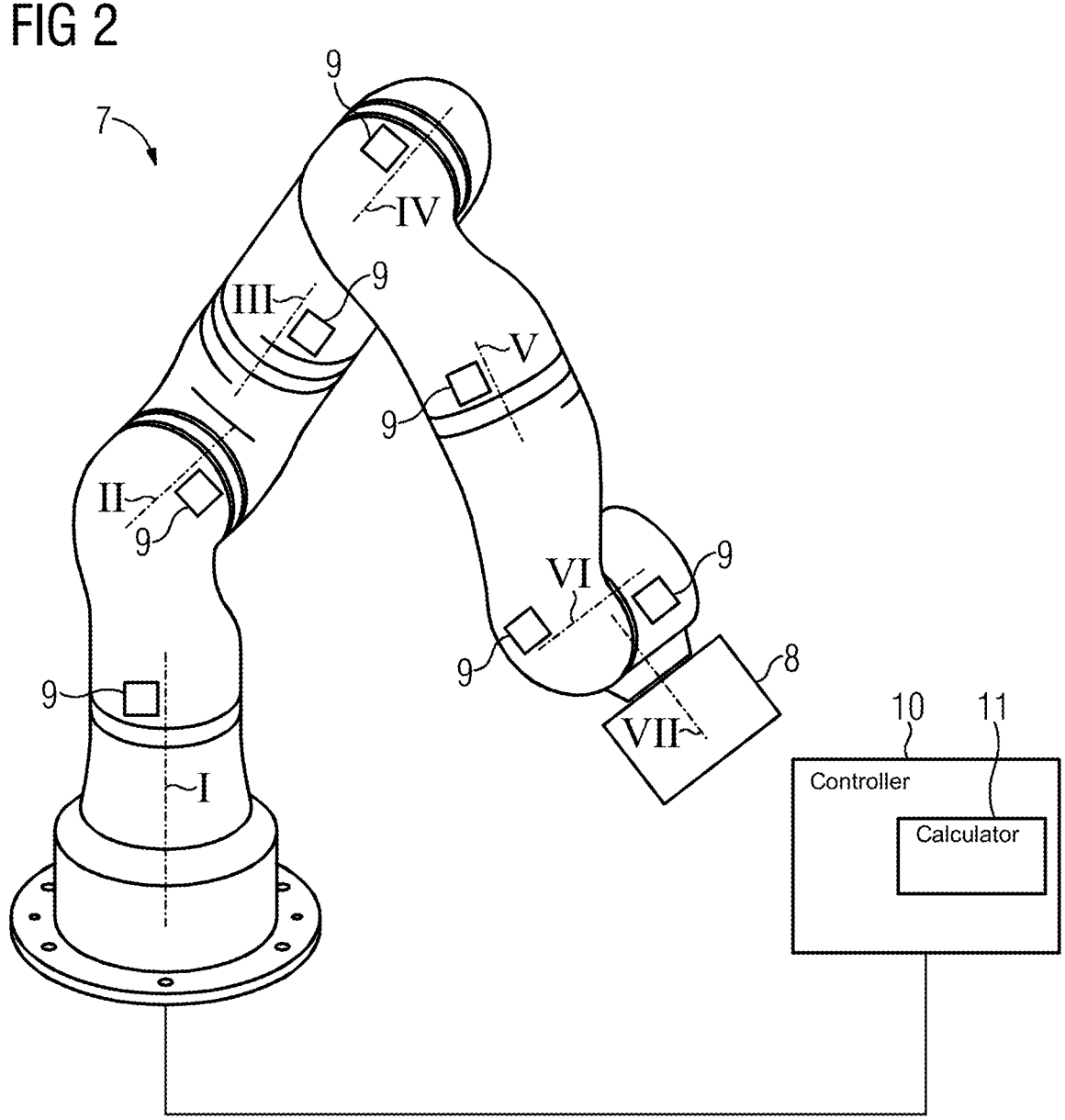
FIG. 2 is a view of a serial articulated arm robot.

FIG. 1 shows a sequence of a method for the absolute position determination of the end effector of a robotic device with a kinematic chain of movable components. An example of a robotic device for carrying out the method is shown FIG. 2 in the form of a seven-axis articulated robot 7 in a light-weight design. The seven-axis articulated robot 7 has seven axes I to VII about which the robot 7 may be moved by corresponding joints and hence has seven degrees of freedom. This enables the end effector 8 (this can be any tool, instrument or an instrument holder) arranged on the movable end of the robot 7 to be positioned flexibly as required. For seven-axis robots, an infinite number of solutions are available for each three-dimensional position and orientation. On least one axis, preferably all the axes, the seven-axis articulated arm robot 7 includes torque sensors 9 with which the torque or a value corresponding to the torque may be measured on the corresponding axis.

The robot 7 is actuated by a system controller 10, which controls and/or regulates, for example, the movement of the axes, the positioning of the end effector 8 and the torque sensors 9. The robot 7 also includes a calculator 11, which may, for example, be arranged in or be formed by the system controller 10 or also externally. To this end, the calculator 11 is embodied as a processor to determine calculated torques from model data. The model data (for example, the exact weight of the robotic device and the instruments attached thereto, values for production tolerances, values for temperature effects, values for dynamic effects, etc.) is generally supplied at the factory or is available on the commissioning of the robot 7 and may, for example, be stored in a memory. It is then possible to calculate from the model data the corresponding torque for each axis for an adopted position. The calculator 11 is also embodied to determine a calculation of differences between measured and calculated torques, to compare the differences with prespecified threshold values, and to calculate the absolute position of the end effector using measured torques.

In a first step 1, at least one current torque or a value corresponding to the torque is measured on at least one axis of the robot 7. For example, of the seven-axis articulated robot 7, a torque sensor 9 arranged on an axis measures the torque. In particular, the respective current torque or the value corresponding to the torque is measured by each of the torque sensors 9. In a second step 2, at least one torque calculated on the basis of a model or model data of the robotic device for the axis is provided. The model data is generally available in a memory and may be used at any time as required. The torque may be calculated from the model data (for example the exact weight of the robotic device and of the instruments attached thereto, values for production tolerances, values for temperature effects, values for dynamic effects etc.) by calculation for the corresponding axis using the model. It is, for example, possible to use the calculator 11 or the system controller 10 as the calculator for the calculation. The calculation and the measurement may be performed simultaneously or in sequence.

Then, in a third step 3, a difference between the respective measured torque and calculated torque is formed for each axis in question. This difference may also be called the "external torque." The external torque may be induced either by errors in the model calculation or by an external influence, for example contact with an external object. If the difference deviates significantly from zero, it may be assumed that a deviation from the absolute position is to be expected. In a fourth step 4, the difference is compared with a previously determined threshold value. This may, for example, also be carried out by the calculator 11 or a comparator. The threshold value may be defined in advance manually or automatically or specified at the factory stage. If the threshold value is exceeded, in a fifth step 5, the at least one measured torque is used instead of the calculated torque for the determination of the absolute position of the end effector 8 of the robot 7.

The torque sensors supply the measured torque of the axes or joints of the robot. Since the weights of the robot and any other data are known, it is possible to extrapolate their influence on the torque therefrom. The remaining torque is called the external torque. Unless equal to zero, this external torque indicates a deviation between a model assumption and the actual situation. It is not generally possible to ascertain without further aids whether this deviation occurs as a result of contact or of false information. However, it is possible to utilize the adaptation of the dynamic correction. Regardless of the cause of the deviation, the calculation in the absolutely correct model is only correct if this is calculated in the model, not, as previously, with the model values, but with the model values+/−external torque=measured actual torque. This enhances the accuracy in the case of contact or false model assumptions. If the robot is in contact with something or has been incorrectly configured (typically: false details of the weight on the end effector due to the user or a change to the weight because the end effector grips a component of which the mass and center of mass is unknown or inaccurately known), the assumptions regarding the dynamic components in the absolute model are no longer applicable. Due to the torque sensors 9, the information from the model is no longer a mandatory requirement. The model can be supplied with the measured torques.

One embodiment may be summarized as follows: for a particularly accurate calculation of absolute positions during the determination of the position of the end effector of a robotic device using a model, in the event of a deviation, torques measured by torque sensors are used instead of the usual torques calculated from model data in the model.

Although the invention has been illustrated and described in detail by the preferred exemplary embodiment, it is not limited by the disclosed examples and a person skilled in the art can derive other variations here from without departing from the scope of the invention. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

The invention claimed is:

1. A method for absolute position determination of the end effector of a robot with a kinematic chain of movable components, the method comprising:
   measuring at least one current torque on at least one of the movable components of the kinematic chain of the robot by a torque sensor arranged on the at least one of the movable components,
   calculating at least one calculated torque on the basis of model data of the robot for the at least one of the movable components,
   determining a difference between the at least one current torque and the at least one calculated torque, and
   when the difference exceeds a prespecified threshold value, using the at least one current torque instead of the at least one calculated torque to determine an absolute position of the end effector of the robot.

2. The method as claimed in claim 1, wherein measuring comprises measuring at least two current torques, wherein calculating comprises calculating at least two corresponding calculated torques, wherein determining comprises determination at least two differences, and wherein using comprises, for each of the at least two differences that exceeds a prespecified threshold value, the corresponding measured torque is used instead of the calculated torque to determine an absolute position of the end effector of the robot.

3. The method as claimed in claim 2, wherein each of the at least two differences are used as a starting point for the determination of a respective external torque.

4. The method of as claimed in claim 1, wherein the difference is used as a starting point for the determination of a respective external torque.

5. A robotic device for position determination, the robotic device comprising:
   a kinematic chain of movable components,
   a first torque sensor for measuring a torque on at least one of the movable components of the kinematic chain,
   an end effector arranged on an end of the kinematic chain, the kinematic chain of the moveable components configured to position the end effector,
   a controller configured to actuate the kinematic chain,
   a calculator configured to determine a calculated torque from model data, to calculate a difference between a measured torque from the first torque sensor and the calculated torque, to compare the difference with a prespecified threshold value, and to determine the position of the end effector from the calculated torque and the measured torque.

6. The robotic device as claimed in claim 5, wherein the kinematic chain comprises a serial articulated arm robot.

7. The robotic device as claimed in claim 5, further comprising a second torque sensor arranged on a different point of the kinematic chain than the first torque sensor.

8. The robotic device as claimed in claim 6, further comprising a second torque sensor arranged on a different point of the kinematic chain than the first torque sensor.

* * * * *